United States Patent
Koyanagi et al.

(10) Patent No.: US 6,909,206 B2
(45) Date of Patent: Jun. 21, 2005

(54) FLAT ROTOR AND MOTOR COMPRISING THE SAME

(75) Inventors: Naohisa Koyanagi, Isesaki (JP); Akihisa Inoue, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 0 days.

(21) Appl. No.: 10/834,335

(22) Filed: Apr. 28, 2004

(65) Prior Publication Data

US 2004/0212270 A1 Oct. 28, 2004

(30) Foreign Application Priority Data

Apr. 28, 2003 (JP) ....................................... 2003-123475

(51) Int. Cl.[7] .............................................. H02K 1/04
(52) U.S. Cl. .............................. 310/43; 310/71; 310/81; 310/235
(58) Field of Search .......................... 310/43, 71, 81, 310/127, 328, 231–237, 268

(56) References Cited

U.S. PATENT DOCUMENTS

| | | | | |
|---|---|---|---|---|
| 4,728,833 A | * | 3/1988 | Shiraki et al. | 310/68 R |
| 6,507,136 B1 | * | 1/2003 | Yamaguchi | 310/128 |
| 6,674,202 B2 | * | 1/2004 | Yamaguchi | 310/128 |
| 2002/0175575 A1 | * | 11/2002 | Nishikata et al. | 310/71 |
| 2004/0189130 A1 | * | 9/2004 | Hovanky et al. | 310/156.32 |

FOREIGN PATENT DOCUMENTS

JP          10-248229          9/1998

* cited by examiner

*Primary Examiner*—Thanh Lam
(74) *Attorney, Agent, or Firm*—Jordan and Hamburg LLP

(57) ABSTRACT

For the purpose of preventing resin from flowing into a commutator when resin molding a rotor, a rotor for a flat coreless motor comprises a printed wiring board, on one side of which a plurality of air-cored armature coils are provided, and on the other side of which a plurality of segment patterns constituting a commutator and a wiring pattern are provided. These members are molded with resin into a unitary body with the segment patterns exposed. Wiring pattern parts are provided so as to surround the outer periphery of the commutator.

20 Claims, 5 Drawing Sheets

FLAT ROTOR AND MOTOR COMPRISING THE SAME

BACKGROUND OF THE INVENTION

1. Field of Invention

The present invention relates to a rotor which is formed using a printed wiring board and a small flat air-cored vibration motor having such a rotor and used for example in silent call means in a mobile telecommunication device and in MD devices.

2. Description of the Related Art

Conventionally, on one surface of a printed wiring board used in a rotor, an air-cored armature coil with a solder-connected terminal is disposed on a prescribed wiring pattern on the printed wiring board, and on the other surface a plurality of segment patterns constituting a commutator and a wiring pattern are disposed. Then by molding the printed wiring board and air-cored armature coil into a unitary body with a resin, in such manner that these segment patterns are exposed, a rotor for a flat coreless motor is formed. (For example, see JP, 10-248229, A.)

In the production method for such a rotor, first a printed wiring board is constituted such that on one side thereof a plurality of segment patterns constituting a commutator and a wiring pattern are disposed. On the side of the printed wiring board opposite the side on which a plurality of segment patterns constituting a commutator and a wiring pattern are disposed, an air-cored armature coil is solder-connected at its terminal to a prescribed wiring pattern. Thereafter, this printed wiring board is set in a mold and the air-cored armature coil and printed wiring board are molded with a resin to form a unitary body in such a manner that the segment patterns are exposed. In such manner a rotor is produced.

FIG. 4 shows a conventional example. However, as can be seen in FIG. 4, on a board surface 41b of a printed wiring board 41, segment patterns 42 forming a commutator with a thickness of roughly 40 µm and a wiring pattern are provided. When the printed wiring board 41 on which such parts are provided is set in a mold K for molding into a unitary body with a resin, the wiring pattern and segment patterns 42 come in contact with mold surface Ks, thus forming a gap S of roughly 40 µm between the mold surface Ks and the board surface 41b.

When in such a state the mold is filled with a resin 47, and the resin 47 penetrates into this gap S forming a burr B. In some cases, the resin 47 that has penetrated into this gap S will even reach the space between adjoining segment patterns 42.

If a burr formed in the manner described above is present on a printed wiring board, when motor parts are assembled, a variety of problems may arise, such as the burr coming in contact with a case or magnet, causing interference defects, or else after assembly the burr breaking off and remaining as a foreign object within the motor.

SUMMARY OF THE INVENTION

The present invention is configured so that the above problems do not arise. The pattern parts of a printed wiring board are used so that when a rotor is molded with resin, the resin does not flow into the spaced formed due to the difference in grade between the board and patterns.

In order to obtain the above object, the present invention is configured so that on one side of a printed wiring board a plurality of air-cored armature coils are disposed, and on the other side a segment pattern formed by a plurality of segments arranged mutually equidistant in a ring shape centering on the rotor rotation center and a wiring pattern are provided. The printed wiring board and the plurality of air-cored armature coils are molded into a unitary body with a resin in such a manner that the wiring pattern and the segment patterns are exposed. The wiring pattern is provided in the space between the segment pattern and the edge of the printed wiring board so as to surround the segment pattern. Further, the wiring pattern is a pattern for shorting the plurality of segments, and one or more places of division may be provided so that the wiring pattern is electrically partitioned.

When the various parts are configured in such manner, even if a gap is formed between a board surface and a mold, a wiring pattern section is provided between the outside of the segment pattern in the rotor radial direction and the edge of the printed wiring board, so as to surround the outside of the segment pattern in the rotor radial direction. Accordingly, resin is blocked by this wiring pattern and does not flow inward in the printed wiring board radial direction. In particular, if this wiring pattern is provided as close as possible to the edge of the printed wiring board, almost no resin flows onto the board surface, preventing formation of burrs and the like.

In addition, because the wiring pattern is not in a loop electrically, even if the rotor operates in the magnetic field formed by the coils and a drive magnet, no inductive electromotive force arises. Therefore, the eddy current that would arise therefrom is prevented, so that there is no resistance in the wiring pattern due to the effects of such eddy currents.

The ideal location for a wiring pattern from the standpoint of preventing burrs and the like is one such that the edge of the printed wiring board and the edge of the outside of the wiring pattern in the rotor radial direction exterior match.

The places of division of a wiring pattern provided so as to surround the outside of the segment pattern in the rotor radial direction may be provided with structural parts so as to prevent resin from penetrating inward in the rotor radial direction. Specifically, wiring patterns adjoining a place of division may be disposed so that they overlap when seen from the printed wiring board radial direction, and adjoining throughhole lands and checker lands may be disposed in close proximity to each other.

When the various parts are constituted in such a manner, even if places of division are provided in the wiring pattern to prevent eddy currents, due to a labyrinth construction in which wiring patterns adjoining a place of division are mutually interlocking, resin that at the time of rotor molding, flows into a place of division which is met with resistance and does not flow inward into the printed wiring board in the rotor radial direction.

A rotor having such a resin flow prevention mechanism may be used in a motor.

A motor incorporating a rotor constituting such parts is highly reliable as commutation defects arising between a brush and segment pattern and caused by burrs and by resin flowing between segment patterns are prevented.

In addition, by making adjustments to existing wiring patterns, the inflow of resin is prevented. Thus there is no need for additional members and the cost of parts can be kept in check.

DESCRIPTION OF THE PREFERRED EMBODIMENTS

A first embodiment of the present invention will now be explained with reference made to the figures.

Figure 1:
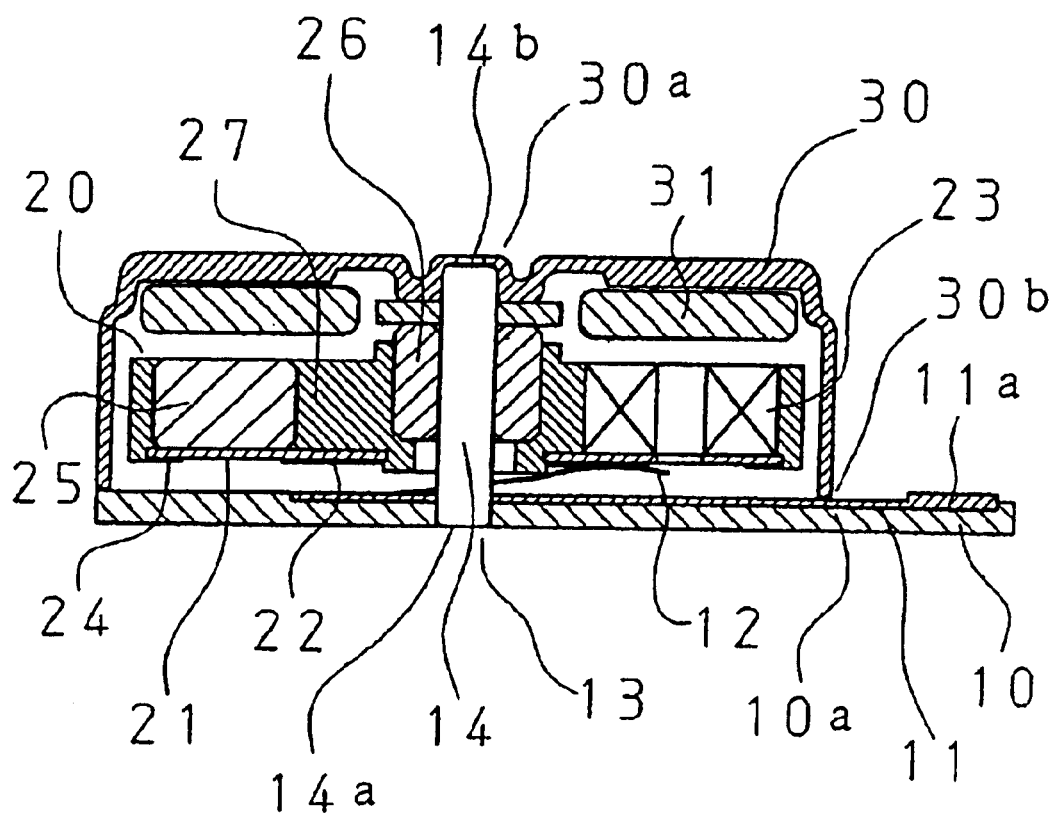
FIG. 1 is a cross-sectional view of a flat vibration motor using a rotor having a construction to prevent inflow of resin, such motor being a first embodiment of the present invention.

FIG. 1 is a cross-sectional view of a flat vibration motor using a rotor having a construction to prevent inflow of resin, such motor being a first embodiment of the present invention.

The motor shown in FIG. 1 comprises a bracket 10, a rotor 20 and a housing 30.

On the bracket 10 a printed wiring element 11 is provided. The portion of the printed wiring element 11 that extends outside of the housing 30 has a feed terminal part 11a for feeding current from outside the motor to the rotor 20. Further, a brush 12 is provided within the housing of this printed wiring element 11 so as to be in sliding contact with a segment pattern 22. This brush 12 is electrically connected with the feed terminal part 11a via the printed wiring element 11 and transmits current received from the feed terminal part 11a to a coil 23 via the segment pattern 22.

In addition, the bracket 10 has a hole part 13. Into this hole part 13 an end portion 14a of a shaft 14 for rotatably supporting the rotor 20 is inserted. The shaft 14 is fixed to the bracket 10 by spot welding points of contact between the and portion 14a of the shaft 14 and the bracket 10.

The rotor 20 comprises a printed wiring board 21 on which are disposed the segment patterns 22 constituting a commutator and a wiring pattern 24. A coil 23 is connected to a prescribed position of the wiring pattern on the printed wiring board and a weight 25 and a bearing 26 are provided.

The coil 23, weight 25, and bearing 26 are disposed on one side of the printed wiring board 21 opposite the side on which the segment patterns 22 constituting the commutator and wiring pattern 24 are disposed. These parts constituting the rotor are molded into a unitary body with a resin 27 in such a manner that the commutator is exposed.

The weight 25 is a member for causing an eccentric force when the rotor 20 rotates and is disposed at a position where it can cause the balance of the rotor surface to be weighted to one side.

The housing 30 is provided with a recessed portion 30a that supports an end part 14b of the shaft 14 when the motor parts are assembled. In addition, a drive magnet 31 is disposed within the housing 30 at a position so as to be opposite the coil 23 when the rotor 20 is assembled.

The housing 30 is fixed to the bracket 10 by spot welding at meeting point 10a between the housing end part 30b and the bracket.

Figure 2A:
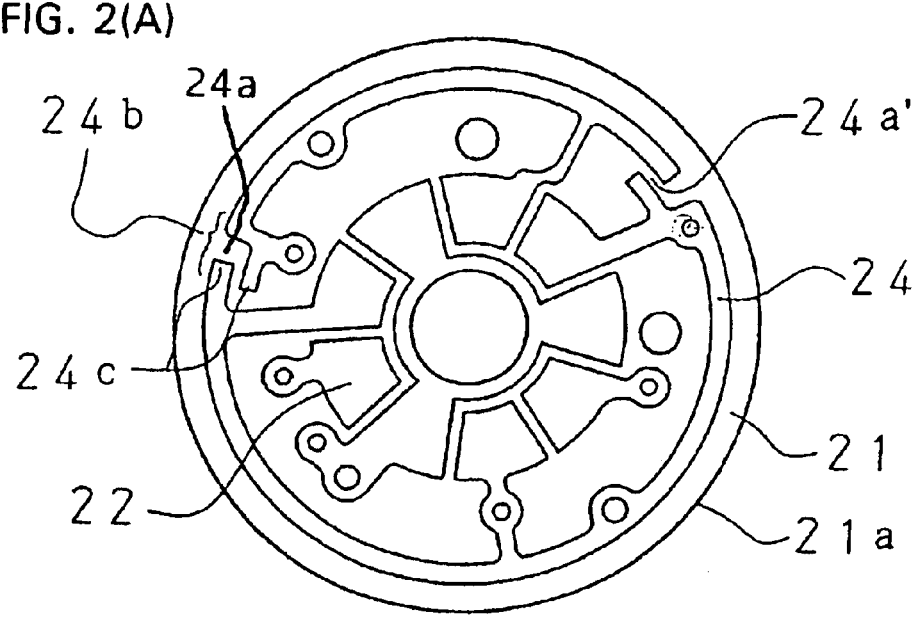
FIG. 2(A) is a plan view of the side of a printed wiring board on which a commutator is provided.

FIG. 2(A) is a plan view of the side of the printed wiring board 21 on which the segment pattern 22 and the wiring pattern 24 are disposed.

Figure 2B:
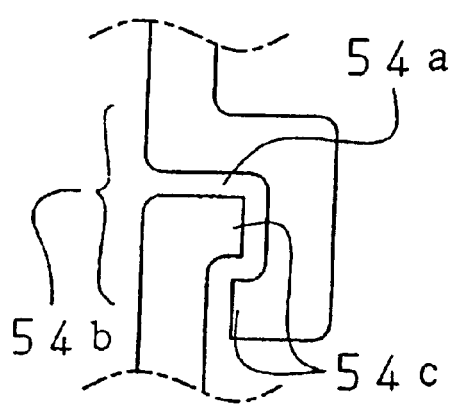
FIG. 2(B) is an alternative labyrinth construction.

FIGS. 2(B) and (C) are expanded plan views of a labyrinth construction formed by adjacent wiring patterns 24 disposing in an interlocking manner so that they overlap in the radial direction.

Figure 3A:
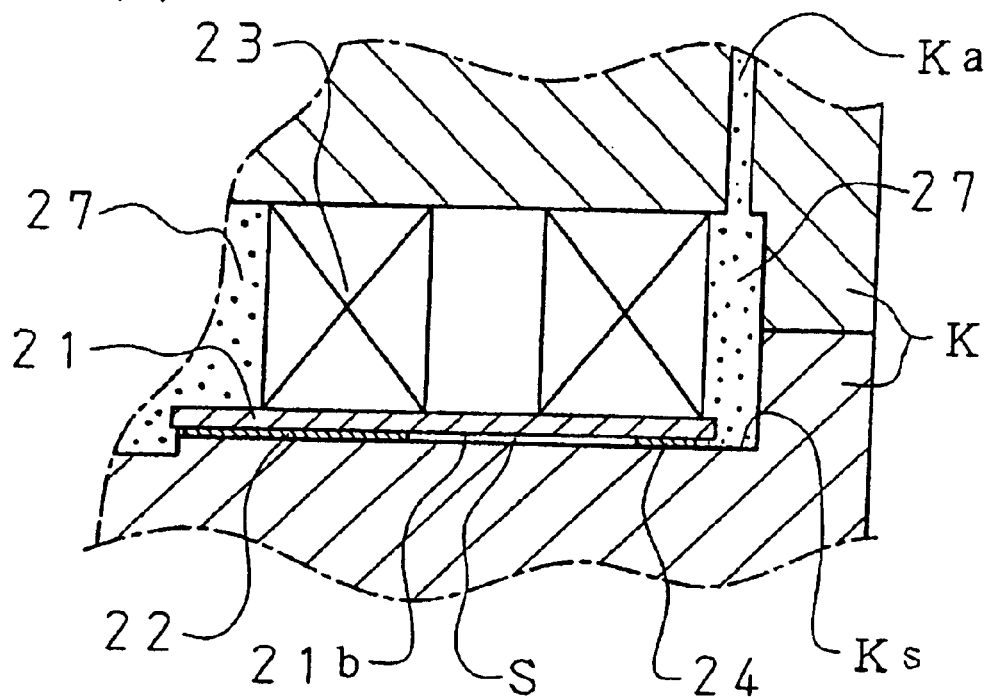
FIG. 3(A) is a cross-sectional view of a rotor resin molded in a mold die.
Figure 3B:
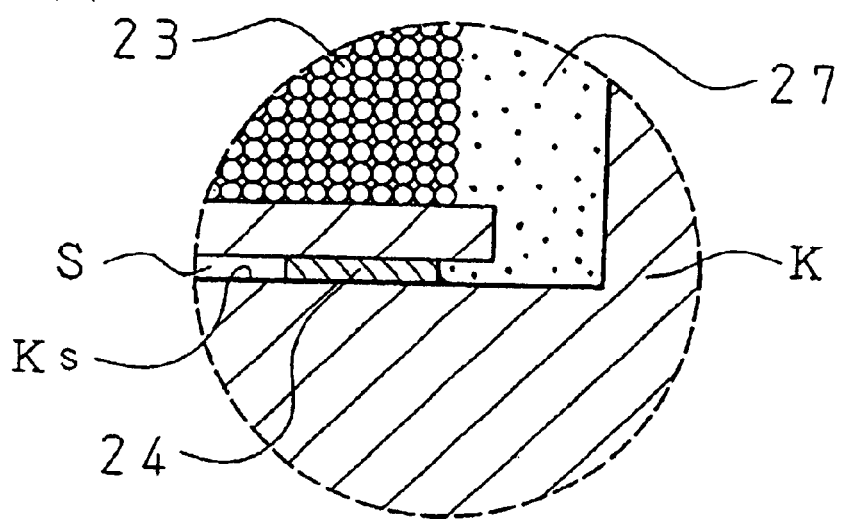
FIG. 3(B) is an enlarged portion of FIG. 3(A).
Figure 4:
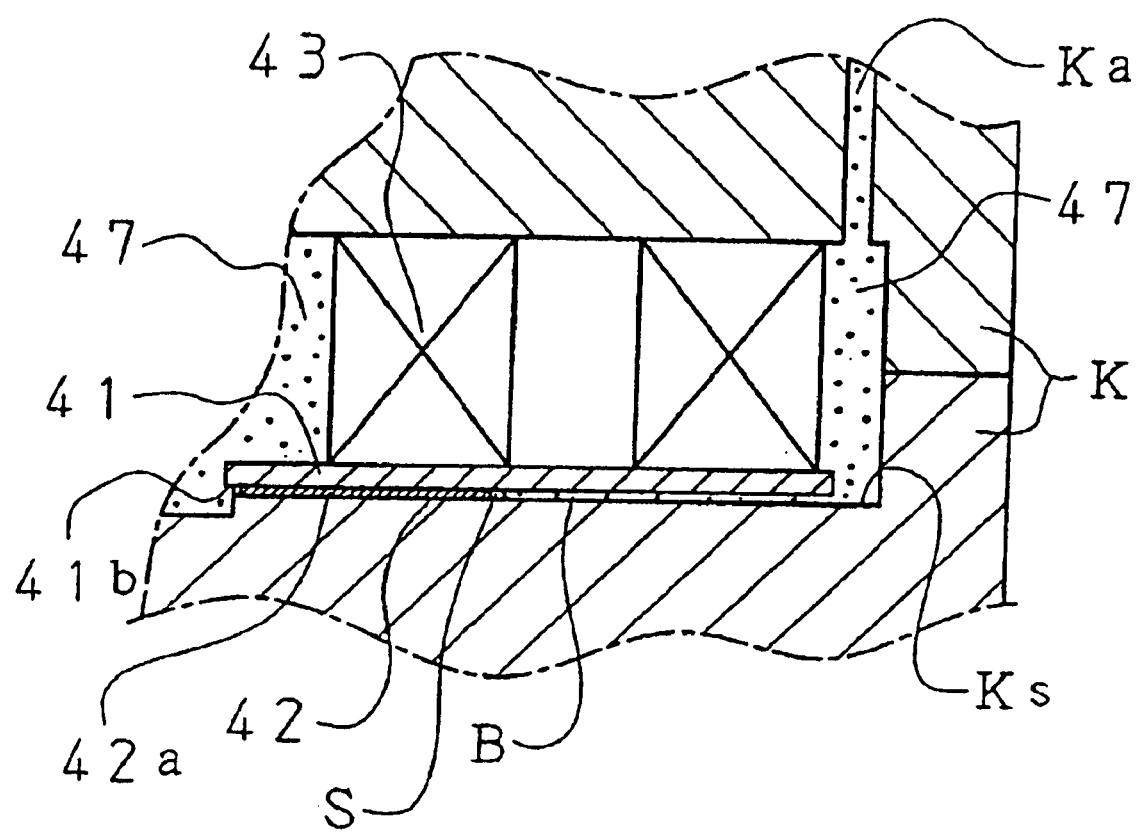
FIG. 4 shows conventional art.

FIGS. 3(A) and (B) are cross-sectional view of a rotor resin-molded in a mold.

As seen in FIG. 2(A), the wiring pattern 24 is provided in the space between the outside in the rotor radial direction of the plurality of segment patterns 22 arranged in a ring shape centering on the rotation center of the rotor 20 in order to form a commutator, and an edge 21a of the printed wiring board, such wiring pattern 24 surrounding the segment patterns 22.

As seen in FIGS. 3(A) and (B), the above members are set in a mold K, and a rotor is formed by molding such members into a unitary body with a resin 27.

Conventionally, when such a rotor is formed, because the resin 27 is fluid, it passes through a gap S between the printed wiring board 21 and the mold K, flowing to the side of the printed wiring board 21 where the segment patterns 22 are disposed, thus reaching the commutator which is constituted by the segment patterns 22. However, in the present invention, the wiring pattern 24 is disposed so as to cover the outer periphery of the segment patterns 22 so that even if there is a gap S between the board surface 21b and the mold K, the resin is stopped by this wiring pattern 24. Therefore the flow of resin is prevented from reaching the segment patterns 22, reducing the occurrence of burrs and the like.

As shown in FIG. 2(A), the wiring pattern 24 is divided, so that the wiring pattern does not form an electrical loop. Therefore, when the printed wiring board 11 operates within the magnetic field created by the coil 23 and drive magnet 31, the occurrence of induced electromotive force is prevented, and the eddy current that would result thereby is suppressed. In short, by configuring the various parts in this manner, the dynamic resistance that eddy currents would cause in the wiring pattern is prevented, reducing electrical loss.

While the wiring pattern 24 is provided with places of division in order to prevent eddy currents, as described above, these places of division are provided with structural section to prevent resin from moving inward in the rotor radial direction. Thus the flow of resin into the printed wiring board surface 21b can be prevented.

Specifically, as shown in FIG. 2(A), by changing the shape of a wiring pattern end part 24c of one of the wiring patterns 24 adjoining the place of division 24a so that when seen from the radial direction it overlaps the other wiring pattern end part 24c, a labyrinth construction 24b is formed. Another place of division is shown at 24a'.

As seen in the modification of the foregoing shown in FIG. 2(B), by shaping the end of a wiring pattern configured according to the foregoing so as to be even closer to an adjoining wiring pattern, a labyrinth construction is achieved. In FIG. 2(B), 54a and 54c show the wiring pattern end sections adjoining the place of division 54b.

Figure 2C:
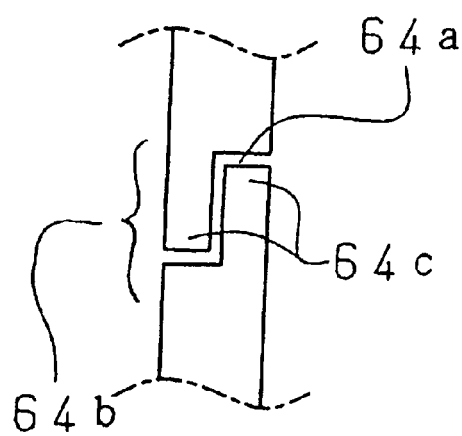
FIG. 2(C) is an alternative labyrinth construction.

FIG. 2(C) shows a modification of the foregoing. In order to configure a labyrinth construction part within a wiring pattern, adjoining wiring pattern end sections are formed so as to have a cutaway, so that these adjoining wiring pattern end sections 64a and 64c overlap at the place of division 64b when seen from the radial direction.

Making the gap between these adjoining wiring pattern end parts as small as possible is effective in blocking resin.

By thus configuring the wiring pattern end sections, the places of division form an interlocking shape. Even if resin seeps into the places of division, there is resistance that blocks the resin flow. In addition, because the places of division are interlocking, the distance in the rotor radial direction from the outside (in the rotor radial direction) of the pattern section, through the places of division, and to the internal section of the pattern where the segment parts are, increases, making it even more difficult for the resin to penetrate to the inside of the pattern where the segment patterns 22 are located.

In the embodiment of FIG. 2(A), places of division are provided in two places in the wiring pattern, thus dividing the wiring pattern into two sections. However, because the only requirement is that the wiring pattern not form a loop, a configuration with a single place of division and hence one wiring pattern is permissible, as well as one with three places of division and three wiring patterns.

Figure 5:
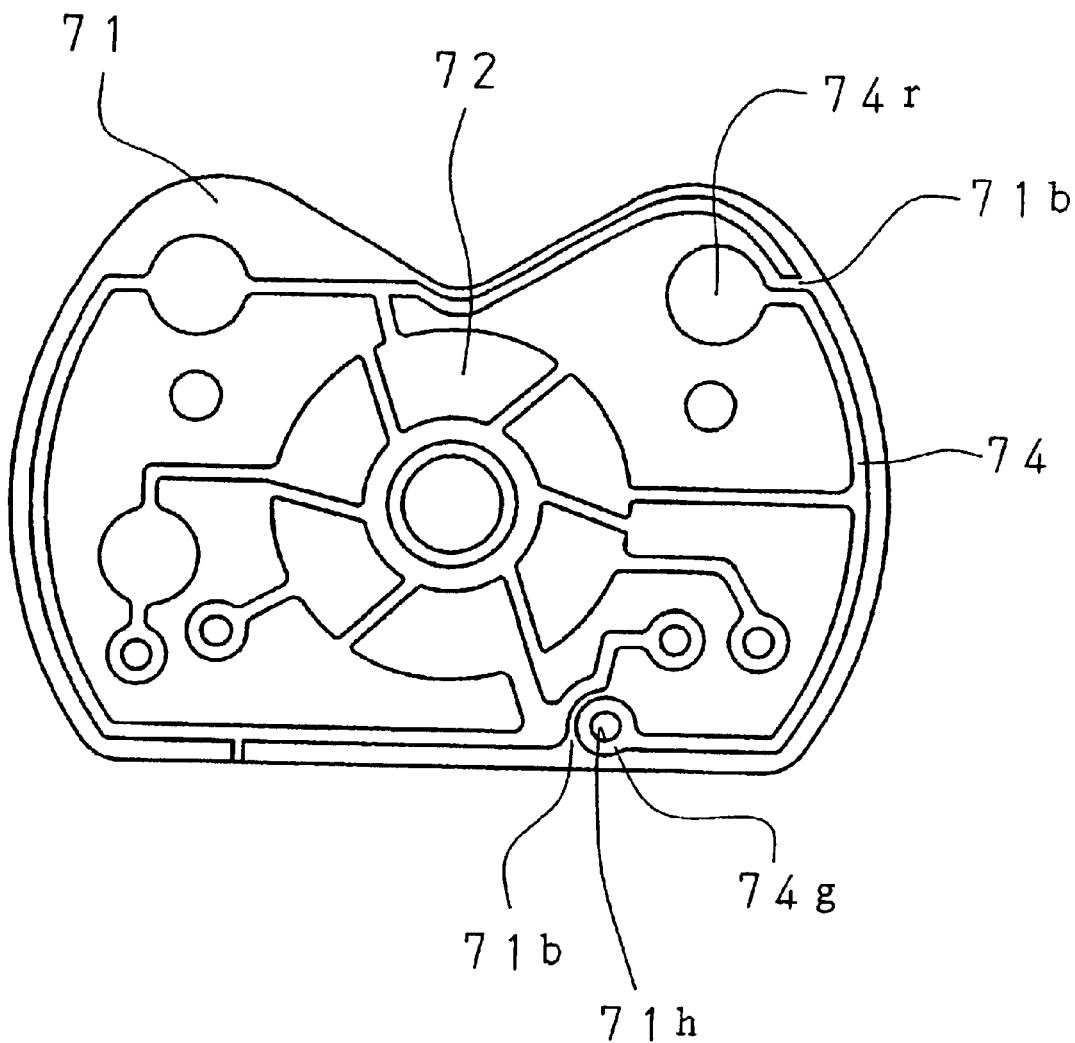
FIG. 5 is a plan view showing a second embodiment of the present invention.

FIG. 5, which shows another embodiment of the present invention, is a plan view, of the surface of a printed wiring board 71 on which a segment pattern 72 is provided. The segment pattern 72 and wiring pattern 74 are provided on the printed wiring board 71, and a throughole 71h is formed therein.

The throughole 71h is for electrically connecting the two sides of the printed wiring board 71. The wiring pattern 74 surrounds the outer perimeter of the throughole, forming a throughole land 74g.

A portion of the wiring pattern 74 is given an expanded shape, forming a checker land 74r, which comes in contact with a tester for confirming conductivity of the wiring pattern and a coil (not shown).

The printed wiring board 71 as described above uses the various parts on the board to form the labyrinth construction sections 71b.

Specifically, the throughole land 74g and the wiring pattern 74, or two adjoining throughole lands 74, are disposed in close proximity to each other, and the wiring pattern is disposed in close proximity to the checker land 74r, conforming to the outer form thereof, thus forming the labyrinth construction 71b.

If the various parts are thus configured, because the outer form of the checker land 74r and throughole land 71g are curved, placing these parts in close proximity to each other facilitates easy construction of the labyrinth construction, thus achieving the same effect as was seen in the first embodiment.

When a rotor is configured in accordance with the present invention, even when there is a gap between a board and mold, because a wiring pattern section is disposed between the outside of the segment pattern in the rotor radial direction and the edge of the board, so as to surround the outside of the segment pattern in the rotor radial direction, the flow of resin into the wiring pattern is blocked and resin is prevented from flowing inward in the printed wiring board radial direction.

Thus a rotor is provided such that when molding, no resin flows in among segment patterns.

Explanation of the Indicators

10 BRACKET
11 PRINTED WIRING BOARD
11a TERMINAL PART
12 BRUSH
13 HOLE PART
14 SHAFT
20 ROTOR
21 PRINTED WIRING BOARD
21a PRINTED WIRING BOARD EDGE
21b PRINTED WIRING BOARD SURFACE
22 SEGMENT PATTERN
23 COIL
24 WIRING PATTERN
24a,54a,64a PLACES OF DIVISION IN WIRING PATTERN
24b,54b,64b LABYRINTH STRUCTURE PARTS
24c,54c,64c WIRING PATTERN END PARTS
26 BEARING
27 RESIN
30 HOUSING
31 DRIVE MAGNET
41 PRINTED WIRING BOARD
41b PRINTED WIRING BOARD SURFACE
42 SEGMENT PATTERN
43 COIL
B BURR
K MOLD
Ks MOLD SURFACE
S GAP

What claimed is:

1. A rotor comprising:
   a wiring board,
   armature coils on one side of said wiring board;
   a segment pattern and a wiring pattern on an opposite side of said wiring board:
   a molded resin in the form of a unitary structure which encompasses said armature coils, said segment pattern and said wiring pattern in which said segment pattern is exposed, said unitary structure having an axis of rotation;
   said wiring pattern having at least one division structure providing a space forming an electrical partition;
   said wiring pattern being disposed radially outwardly of said segment pattern and said division structure having an arrangement which restricts resin from being juxtaposed to said segment pattern.

2. A rotor according to claim 1 wherein said segment pattern comprising a plurality of segment parts arranged about said axis of rotation.

3. A rotor according to claim 2 wherein said wiring pattern arranged to short said plurality of segment parts.

4. A rotor according to claim 1 wherein said wiring board has an outer edge portion, said wiring pattern being disposed radially inwardly of said outer edge portion.

5. A rotor according to claim 1 wherein said at least one division structure precludes an electrical loop around said segment pattern.

6. A rotor according to claim 1 wherein said division structure includes two division sections separated from one another to form a space therebetween, thereby precluding electrical contact between said division sections.

7. A rotor according to claim 6 wherein said two division sections which define said space restricts the flow of resin through said space to said segment pattern.

8. A rotor according to claim 6 wherein said division sections have at least a partial generally right angle configuration.

9. A rotor according to claim 6 wherein said division sections have at least a partial generally C-shaped configuration.

10. A rotor according to claim 6 wherein said two division sections are disposed in an overlapping arrangement do define said space therebetween.

11. A rotor according to claim 6 wherein at least one of said two division sections is formed by a land structure surrounding a throughole which extends through said wiring board.

12. A rotor according to claim 6 wherein at least one of said two division sections is formed by is an expanded section of said wiring pattern which functions to test the wiring pattern.

13. A rotor according to claim 1 wherein said armature coils comprise a plurality of air-cored armature cores, said segment pattern comprising a plurality of segment parts disposed equidistant from one another in a ring about said axis of rotation.

14. A rotor according to claim 6 wherein said division sections preclude formation of an electrical loop.

15. A motor comprising:
   a housing having motor parts;
   a rotor shaft having an axis;
   a rotor rotatable supported in said housing by said shaft;
   said rotor comprising:
      a wiring board;
      armature coils on one side of said wiring board;
      a segment pattern and a wiring pattern on an opposite side of said wiring board;
      a molded resin in the form of a unitary structure which includes said armature coils, said segment pattern and said wiring pattern in which said segment pattern is exposed, said unitary structure having an axis of rotation;
      said wiring pattern having at least one division structure providing a space forming an electrical partition;
      said wiring pattern being disposed radially outwardly of said segment pattern and said division structure having an arrangement which restricts resin from being juxtaposed to said segment pattern.

16. A motor according to claim 15 wherein said spaced division sections preclude formation of an electrical loop and avoids introduction of an inductive electromative force in said wiring pattern by said armature coils.

17. A rotor according to claim 15 wherein said motor parts comprise a drive magnet, a brush and a bracket.

18. A method of making a rotor which comprises:
   providing a wiring board, armature coils, a segment pattern and a wiring pattern;
   disposing said armature coils on one side of said wiring board;
   disposing said segment pattern on the other side of said wiring board at a radially inner position;
   disposing said wiring pattern on said other side of said wiring board radially outwardly of said segment pattern;
   providing a space between at least two division sections of said wiring pattern to electrically partition said two division sections to electrically partition said two division sections;
   forming a molded resin unitary structure which includes said wiring board, said armature coils, said segment pattern and said wiring pattern; and
   restricting the passage of fluid resin material through said space between said two division sections to thereby exclude resin material from passing to said segment pattern.

19. A method according to claim 18, wherein said restricting of the passage of fluid resin material effects reducing the occurrence of burrs.

20. A method of making a motor comprising the steps of making a rotor according to claim 1 and rotatably supporting said rotor in a motor structure which includes a housing, a motor shaft, a drive magnet, a brush and a bracket.

* * * * *